(12) United States Patent  
Kanayama et al.

(10) Patent No.: US 7,425,141 B2  
(45) Date of Patent: Sep. 16, 2008

(54) ELECTRONIC APPARATUS INCLUDING VISIBLE CONNECTOR

(75) Inventors: Masaki Kanayama, Kawasaki (JP); Mitsuhiko Kawami, Kawasaki (JP); Hisao Morooka, Kawasaki (JP); Yusuke Mizuno, Kawasaki (JP); Sonomasa Kobayashi, Kawasaki (JP); Katsuichi Goto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/594,826

(22) Filed: Nov. 9, 2006

(65) Prior Publication Data

US 2007/0076397 A1    Apr. 5, 2007

Related U.S. Application Data

(63) Continuation of application No. PCT/JP2004/010413, filed on Jul. 22, 2004.

(51) Int. Cl.  
*H01R 13/64* (2006.01)  
*G06F 1/16* (2006.01)

(52) U.S. Cl. .................. 439/135; 439/910; 361/686

(58) Field of Classification Search .......... 439/135, 439/142, 374, 910; 361/683, 686  
See application file for complete search history.

(56) References Cited

U.S. PATENT DOCUMENTS

| | | | |
|---|---|---|---|
| 5,139,439 A * | 8/1992 | Shie | 439/359 |
| 6,166,722 A | 12/2000 | Kawabe et al. | |
| 6,257,902 B1 * | 7/2001 | Shieh | 439/76.1 |
| 6,262,883 B1 * | 7/2001 | Kim | 361/680 |
| 6,267,608 B1 * | 7/2001 | Yagi | 439/142 |
| 2003/0220009 A1 | 11/2003 | Takeguchi et al. | |

FOREIGN PATENT DOCUMENTS

| | | |
|---|---|---|
| JP | 3000303 | 5/1994 |
| JP | 10-133773 | 5/1998 |
| JP | 2003-345464 | 12/2003 |

* cited by examiner

*Primary Examiner*—Neil Abrams  
(74) *Attorney, Agent, or Firm*—Staas & Halsey LLP

(57) ABSTRACT

An enclosure of an electronic apparatus includes an upper panel covering over the upper surface of an inner space of the enclosure. A connector is incorporated in the enclosure. The electronic apparatus allows the upper panel to define the peripheral edge retreating from the tip end of the connector. When the user of electronic apparatus looks down at the upper panel, the user can see the tip end of the connector. The user is in this manner allowed to locate the connector without looking into the side of the enclosure. The user can thus insert a plug or male connector into a connector or female connector with a higher reliability. A cover member may be used to cover over the tip end of the connector.

14 Claims, 5 Drawing Sheets

# ELECTRONIC APPARATUS INCLUDING VISIBLE CONNECTOR

CROSS REFERENCE TO RELATED APPLICATIONS

This application is a continuing application, filed under 35 U.S.C. §111(a), of International Application PCT/JP2004/010413, filed Jul. 22, 2004, the contents of which are incorporated herein.

BACKGROUND OF THE INVENTION

1. Field of the Invention

The present invention relates to an electronic apparatus such as a notebook personal computer, for example. In particular, the invention relates to an electronic apparatus including a female connector receiving a male connector.

2. Description of the Prior Art

A so-called notebook personal computer includes a universal serial bus (USB) connector. The tip end of the USB connector is exposed in an opening defined in the sidewall of the enclosure. For example, Japanese Patent Application Publication No. 2003-345464 discloses a notebook personal computer including a guiding surface for a USB plug in FIG. 4. The guiding surface is defined in a depression formed in the sidewall at a position adjacent to the upper end of the opening.

The depression helps the user of the notebook personal computer locate the opening. However, because the tip end of the USB connector is located in the opening, the user cannot see the USB connector itself. Without looking into the opening, the user possibly inserts a USB plug offset from the USB connector.

SUMMARY OF THE INVENTION

It is accordingly an object of the present invention to provide an electronic apparatus allowing insertion of a male connector into a female connector with a higher reliability.

According to a first aspect of the present invention, there is provided an electronic apparatus comprising: an enclosure including an upper panel covering over the upper surface of an inner space of the enclosure; and a connector incorporated in the enclosure, wherein the upper panel has a peripheral edge retreating from a tip end of the connector.

The electronic apparatus allows the upper panel to define the peripheral edge retreating from the tip end of the connector. When the user of electronic apparatus looks down at the upper panel, for example, the user can see the tip end of the connector. The user is in this manner allowed to locate the connector without looking into the side of the enclosure. The user can thus insert a plug or male connector into the female connector with a higher reliability. A keyboard may be incorporated in the upper panel in the electronic apparatus.

In general, female connectors include tip ends of various shapes or various colors depending on the kinds of the female connectors. As described above, the user can see the tip end of the female connector outside the peripheral edge. The user can thus reliably distinguish the kinds of the female connector based on the shape and/or the color of the female connector. The user can thus insert a male connector into the female connector with a still higher reliability.

The electronic apparatus may further include a side panel covering over the side of the inner space. The side panel may be located outside the peripheral edge of the upper panel in the electronic apparatus. Likewise, a depression may be defined in the side panel in conformity with the peripheral edge of the upper panel. The female connector can be located in the depression. In this case, the electronic apparatus may further comprise a cover member removably located in the depression so as to cover over the tip end of the connector. The cover member contributes to establishment of a good appearance of the enclosure. Furthermore, the cover member can surely protect the female connector from damages.

According to a second aspect of the present invention, there is provided an electronic apparatus comprising: an enclosure; a female connector incorporated in the enclosure; a first support portion defined in the enclosure, the first support portion entirely surrounding the female connector; and a second support portion defined in the enclosure at a position adjacent to the outer end of the first support portion, the second support portion allowing exposure of a part of the periphery of the female connector.

The electronic apparatus allows the second support portion to enable exposure of the periphery of the female connector. The user of the electronic apparatus can thus see the periphery of the connector. The user can locate the female connector without looking into the side of the enclosure. The user can thus insert a male connector into the female connector with a higher reliability. Furthermore, the user can reliably distinguish the kinds of the female connector based on the shape and/or the color of the female connector. The female connector may receive the insertion of the male connector in a horizontal direction in the electronic apparatus.

According to a third aspect of the present invention, there is provided an electronic apparatus comprising: an enclosure body; a female connector extending in a horizontal direction; a depression formed in the enclosure body, the depression extending from the inner end to the outer end, the inner end facing an inner space of the enclosure body, the outer end facing an outside space of the enclosure body, the depression receiving an outer surface of the female connector; and an enclosure cover covering over the depression, the enclosure cover defining the periphery retreating from the outer end of the female connector toward the inner end of the depression.

The electronic apparatus allows the enclosure cover to define the periphery retreating from the outer end of the female connector toward the inner end of the depression. The periphery allows the user of the electronic apparatus to see the tip end of the connector. The user can thus reliably locate the female connector without looking into the side of the enclosure. The user can insert a male connector into the female connector with a higher reliability. Furthermore, the user can reliably distinguish the kinds of the female connector based on the shape and/or the color of the female connector.

According to a fourth aspect of the present invention, there is provided an electronic apparatus comprising: an enclosure including a bottom, a top and a side along a bottom surface, a top surface and a side surface of a box-shaped space; and a connector supported in the side of the enclosure, the connector located within the box-shaped space, wherein the top of the enclosure has a portion along the top surface of the box-shaped space at a position near the connector, said portion formed to make the connector visible.

The electronic apparatus allows the top of the enclosure to have a portion formed to make the connector visible. The portion may be formed to have a transparency, for example. The portion of the top allows the user of the electronic apparatus to see the tip end of the connector. The user can reliably locate the connector without looking into the side of the enclosure. The user can thus insert a male connector into the connector with a higher reliability. Furthermore, the user can reliably distinguish the kinds of the connector based on the shape and/or the color of the female connector. The portion of the top may take a shape to make the connector visible in the electronic apparatus. Likewise, the side of the enclosure may have a depression depressed from the side surface of the box-shaped space at a position near the connector. The depression may occupy a space of a predetermined thickness under the top surface of the box-shaped space within the overall thickness of the enclosure.

Alternatively, the side of the enclosure may have a depression at a position near the connector. The depression may be depressed from the side surface of the box-shaped space. The depression may occupy a space extending from the top surface of the box-shaped space to the bottom surface of the box-shaped space. In this case, the electronic apparatus may further comprise a cover member removably located in the depression so as to cover over the connector. The cover member contributes to establishment of a good appearance of the enclosure. Furthermore, the cover member can surely protect the female connector from damages.

The electronic apparatus may further comprise a keyboard incorporated in the top of the enclosure. In this case, the electronic apparatus may further comprise a display device coupled to the enclosure for relative rotation around a predetermined rotation axis.

BRIEF DESCRIPTION OF THE DRAWINGS

The above and other objects, features and advantages of the present invention will become apparent from the following description of the preferred embodiments in conjunction with the accompanying drawings, wherein.

DESCRIPTION OF THE PREFERRED EMBODIMENTS

Figure 1:
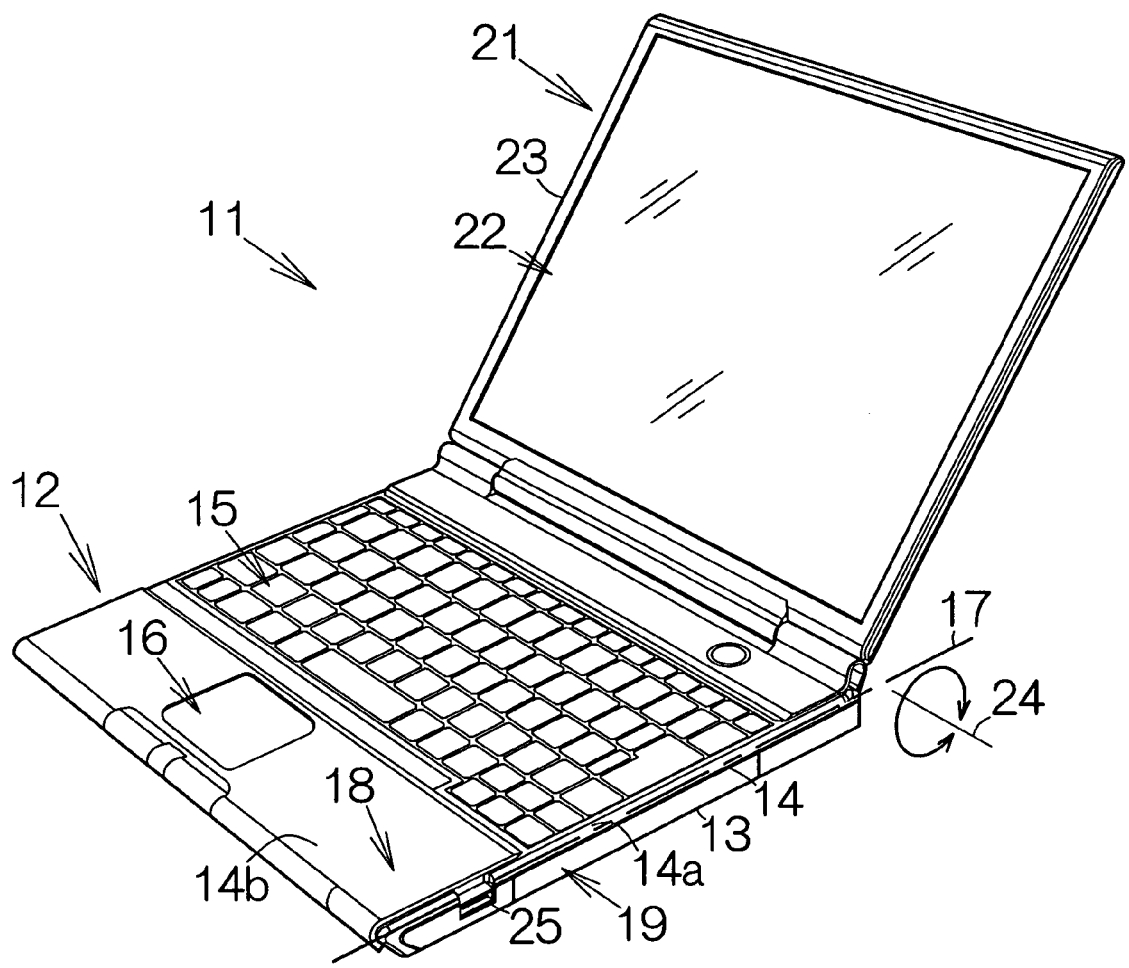
FIG. 1 is a perspective view schematically illustrating a notebook personal computer as a specific example of an electronic apparatus according to an embodiment of the present invention.

FIG. 1 schematically illustrates a notebook personal computer 11 as a specific example of an electronic apparatus according to the present invention. The notebook personal computer 11 includes a main body enclosure 12 enclosing a motherboard, for example. The main body enclosure 12 is formed to have the bottom, the top and the side along the bottom surface, the top surface and the side surface of a box-shaped space. Electronic circuit elements such as a central processing unit (CPU), a memory, and the like, are mounted on the motherboard. The CPU is designed to execute various kinds of processing based on a software program and/or data temporarily held in the memory, for example. The software program and the data may be stored in a large capacity storage, such as a hard disk drive, HDD, likewise enclosed in the main body enclosure 12.

The main body enclosure 12 includes an enclosure body, namely a base 13, and a cover 14. The enclosure body or base 13 may be made of a metallic material, for example. The base 13 and the cover 14 are coupled to each other. The base 13 and the cover 14 in combination define an inner space. Input devices such as a keyboard 15 and a pointing device 16 are embedded in the cover 14. Users manipulate the keyboard 15 and/or the pointing device 16 to input commands and/or data to the CPU. A touch pad may be employed as the pointing device 16, for example.

The cover 14 includes a frame 14a made of a resin material. The frame 14 is superposed on the base 13. A metallic outer plate 14b is fitted in the frame 14. The keyboard 15 and the pointing device 16 are supported on the frame 14a. The pointing device 16 is exposed in an opening defined in the outer plate 14b.

An edge 17 is defined in the main body enclosure 12 based on the periphery of the inner space. The edge 17 serves to divide the top surface and side surface of the inner space. An upper panel 18 and a side panel 19 are in this manner defined in the main body enclosure 12. The upper panel 18 covers over the top of the inner space. The side panel 19 covers over the side of the inner space. Here, the edge 17 is defined in the frame 14a. The frame 14a and the outer plate 14b in combination serve to establish the upper panel 18. The side panel 19 extends from the frame 14a to the base 13. Alternatively, the edge 17 may be defined along the periphery of the upper flat surface defined in the cover 14. It should be noted that when the notebook personal computer 11 is put on a desk or the like, the base 13 defines the bottom of the main body enclosure 12. The upper panel 18 opposed to the bottom serves to define the upper surface of the main body enclosure 12.

A display device 21 is coupled to the main body enclosure 12. The display device 21 includes a display enclosure 23 designed to enclose a flat display panel such as a liquid crystal display (LCD) panel 22, for example. The display enclosure 23 is coupled to the main body enclosure 12 for relative rotation around a rotation axis 24 established at one end of the main body enclosure 12. The display enclosure 23 is thus allowed to rotate relative to the main body enclosure 12. This relative rotation allows the display device 21 to be superimposed on the main body enclosure 12. Texts and graphics are displayed on the screen of the LCD panel 22 based on the processing of the CPU and/or the manipulation of the input devices such as the keyboard 15 and the pointing device 16.

A female connector or universal serial bus (USB) connector 25 is incorporated in the main body enclosure 12. The USB connector 25 is designed to receive the insertion of a male connector or USB plug, not shown, in a horizontal direction. The USB connector 25 may be mounted on the motherboard in the main body enclosure 12, for example. The USB connector 25 enables connection of various kinds of peripheral devices, not shown, including an input device such as a mouse, an external storage device such as a flexible disk drive, FDD, and the like, to the notebook personal computer 11.

Figure 2:
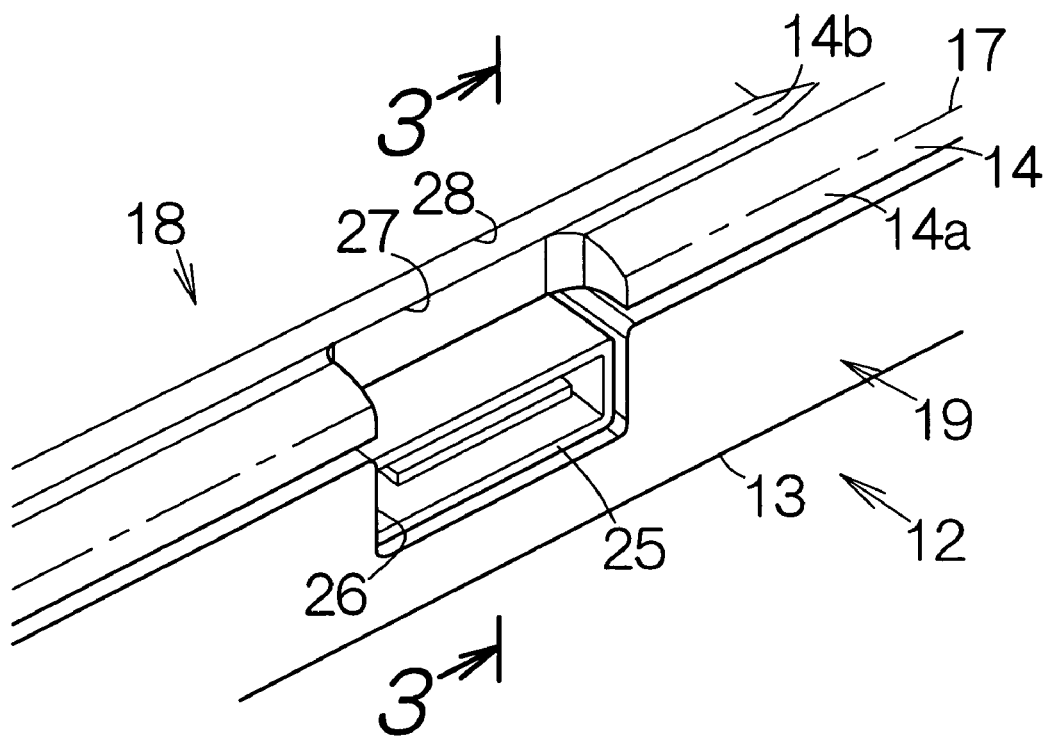
FIG. 2 is an enlarged partial perspective view schematically illustrating the structure of the sidewall of the notebook personal computer.

As shown in FIG. 2, a depression 26 is formed in the base 13 to receive the outer surface of the USB connector 25 in the form of a rectangular parallelepiped. Here, the depression 26 supports the bottom and the sides of the USB connector 25. The USB connector 25 has the tip end or outer end, facing the outer space of the main body enclosure 12, within the depression 26.

The frame 14a defines a periphery 27 retreating from the outer end of the USB connector 25. The outer plate 14b also defines a periphery 28 aligned with the periphery of the frame 14a. The USB connector 25 thus allows the outer end thereof to get exposed at a position adjacent to the peripheries of the frame 14a and the outer plate 14b. The peripheries 27, 28 retreat inward from the side panel 19. The side panel 19 is thus located outside the periphery 27 of the frame 14a. The side panel 19 serves to define the inner space.

The USB connector 25 is located within the box-shaped space related to the main body enclosure 12. The top of the main body enclosure 12, namely the upper panel 18, has a portion at a position where the USB connector 25 is located. Such a portion is formed to take a shape retreating from the side surface of the box-shaped space, namely the reference plane of the side panel 19. Here, the side panel 19 has the outermost surface extending in the reference plane of the side panel 19. The USB connector 25 is in this manner supported in the side panel 19 while the USB connector 25 is made visible outside the periphery of the upper panel 18 of the main body enclosure 12.

Figure 3:
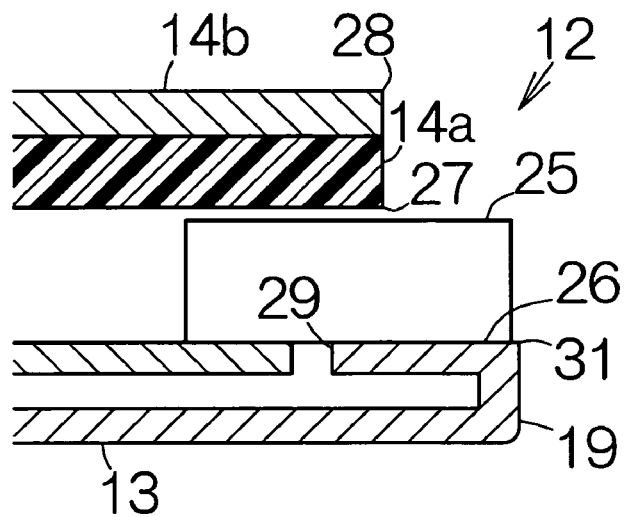
FIG. 3 is an enlarged partial sectional view taken along the line 3-3 in FIG. 2.

As shown in FIG. 3, the frame 14a and the outer plate 14b cover over the depression 26. The frame 14a and the base 13 in combination entirely surround the USB connector 25. The frame 14a and the base 13 in this manner establish a first support portion of the main body enclosure 12. The USB connector 25 is exposed at a position outside the peripheries 27, 28 of the frame 14a and the outer plate 14b. The base 13 serves to cover over a part of the periphery of the USB connector 25. The base 13 in this manner serves to establish a second support portion of the main body enclosure 12 at a position adjacent to the outer end of the first support portion.

The depression 26 extends from the inner end 29 to the outer end 31. The inner end 29 of the depression 26 faces the inner space of the main body enclosure 12. The outer end 31 of the depression 26 also faces the outside space of the main body enclosure 12. The inner end 29 is located at a position inward of the periphery 27 of the frame 14a. As is apparent from FIG. 3, the periphery 27 of the frame 14a retreats from the outer end of the USB connector 25 toward the inner end 29 of the depression 26.

Now, assume that the female connector or USB connector 25 receives a mating male connector or USB plug, not shown. The user of the notebook personal computer 11 looks down at the upper panel 18 in front of the display device 21. Since the frame 14a defines the periphery retreating from the outer end of the USB connector 25, the user is allowed to see the tip end of the USB connector 25. The user can locate the USB connector 25 without looking into the side of the main body enclosure 12. The user can thus insert the USB plug into the USB connector 25 with a higher reliability. This results in a reliable connection between the electrode terminals of the USB plug and the USB connector 25.

In general, female connectors include tip ends of various shapes or various colors depending on the kinds of the female connectors. If female connectors such as the USB connector 25, a power supply connector, an input/output terminal for video or sound, and the like, are arranged in line on the side panel 19, for example, the periphery 27 enables exposure of the tip ends of these female connectors. The user can thus reliably distinguish the kinds of the female connectors based on the shapes and/or the colors of the female connectors. The user can insert male connectors into the female connectors with a still higher reliability.

Figure 4:
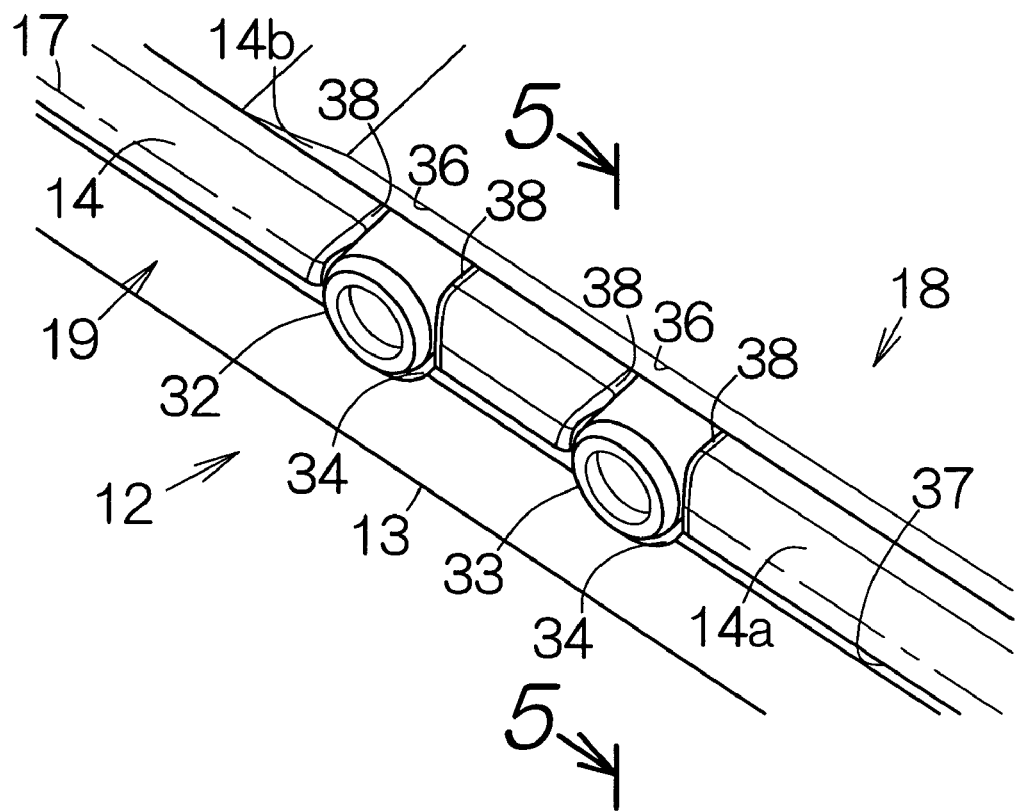
FIG. 4 is an enlarged partial perspective view schematically illustrating the structure of the sidewall of the notebook personal computer.

In addition, depressions 34 may be formed in the base 13 so as to receive the outer surfaces of cylindrical connectors 32, 33 such as a microphone terminal and a headphone terminal, as shown in FIG. 4, for example. The connectors 32, 33 receive the insertion of plug terminals, not shown, in a horizontal direction. The depressions 34 have curved inner surfaces in conformity with the outer surfaces of the connectors 32, 33. The inner surfaces support the lower portions of the connectors 32, 33. The connectors 32, 33 face the outside space of the main body enclosure 12 within the depressions 34.

The outer plate 14b has a periphery 36 retreating from the outer ends of the connectors 32, 33. The frame 14a has a periphery 37 aligned with the outer surface of the side panel 19. Surrounding walls 38, 38 are formed in the frame 14a. The surrounding walls 38, 38 contact the sides of the connectors 32, 33. The surrounding walls 38 extend from the outer ends of the connectors 32, 33 toward the inner ends of the connectors 32, 33. The outer ends of the connectors 32, 33 are thus exposed at positions adjacent to the periphery of the outer plate 14b. The periphery 36 of the outer plate 14b retreats inward from the side panel 19. The side panel 19 is thus located outside the periphery 36 of the outer plate 14b. The side panel 19 serves to define the inner space.

Figure 5:
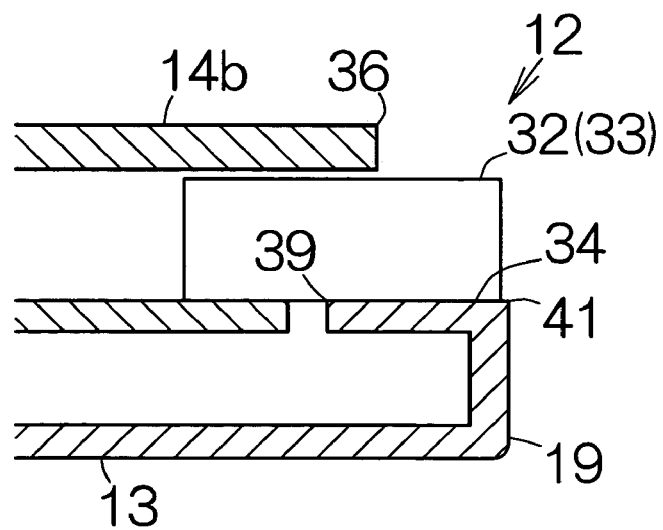
FIG. 5 is an enlarged partial sectional view taken along the line 5-5 in FIG. 4.

As shown in FIG. 5, the outer plate 14b covers over the depressions 34. The peripheries of the connectors 32, 33 are covered with the surrounding walls 38 as described above. The frame 14a, the outer plate 14b and the base 13 in combination entirely surround the connectors 32, 33. The frame 14a, the outer plate 14b and the base 13 in this manner establish a first support portion of the main body enclosure 12. The connectors 32, 33 are exposed at positions outside the periphery of the outer plate 14b. The peripheries of the connectors 32, 33 are partially covered with the surrounding walls 38 of the frame 14a and the base 13. The frame 14a and the base 13 in this manner serve to establish a second support portion of the main body enclosure 12 at a position adjacent to the first support portion.

The depressions 34 extend from the inner ends 39 to the outer ends 41. The inner ends 39 of the depressions 34 face the inner space of the main body enclosure 12. The outer ends 41 of the depressions 34 face the outside space of the main body enclosure 12. The inner ends 39 are located at a position inward of the periphery 36 of the outer plate 14b. As is apparent from FIG. 5, the periphery 36 of the outer plate 14b retreats from the outer ends of the connectors 32, 33 toward the inner ends 39 of the depressions 34.

The connectors 32, 33 are located within the box-shaped space related to the main body enclosure 12. The top of the main body enclosure 12, namely the upper portion of the frame 14a, has a portion at a position where the connectors 32, 33 are located. Such a portion is formed to take a shape retreating from the side surface of the box-shaped space, namely the reference plane of the side panel 19. Here, the side panel 19 has the outermost surface extending in the reference plane of the side panel 19. The connectors 32, 33 are in this manner supported in the side panel 19 while the connectors 32, 33 are made visible outside the periphery of the upper panel 18 of the main body enclosure 12.

When a user intends to insert a microphone plug, a headphone plug, or the like, in the notebook personal computer 11, the user can locate the tip end of the connectors 32, 33 without looking into the side of the main body enclosure 12. The user can thus insert the plugs into the connectors 32, 33 with a higher reliability. Furthermore, the user can reliably distinguish the kinds of the connectors 32, 33 based on the shapes and/or the colors of the tip ends of the connectors 32, 33.

Figure 6:
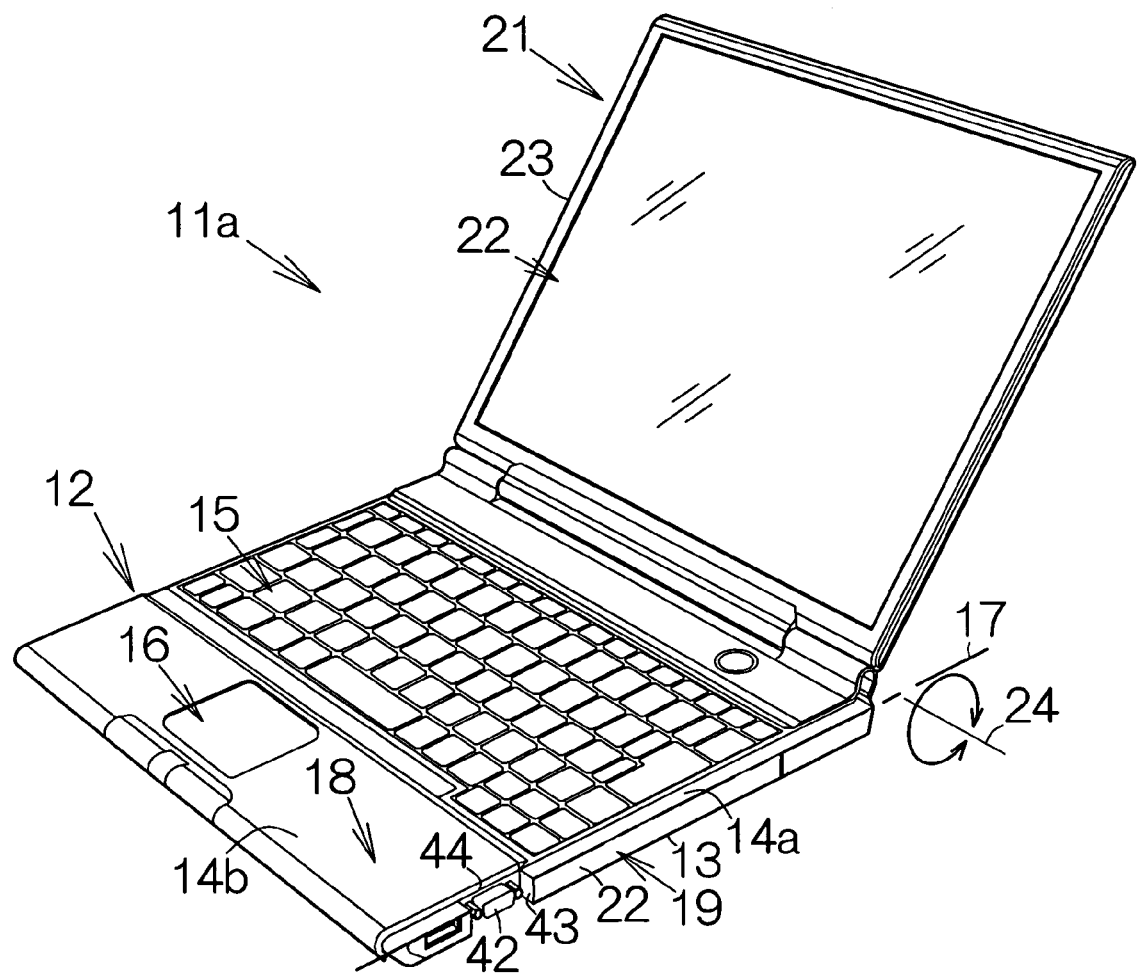
FIG. 6 is a perspective view schematically illustrating the structure of a notebook personal computer according to a modified embodiment of the present invention.

As shown in FIG. 6, for example, a depression 43 may be formed in the side panel 19 so as to contain a connector 42 of a graphics array standard, for example. The connector 42 includes a Video Graphics Array (VGA) connector, a Super VGA (SVGA) connector, and the like.

The frame 14a defines a periphery 44 retreating from the tip end or outer end of the connector 42. The depression 43 is formed in conformity with the periphery 44. The periphery of the outer plate 14b is aligned with the periphery of the frame 14a. The connector 42 allows the outer end thereof to get exposed at a position adjacent to the peripheries of the frame 14a and the outer plate 14b. The periphery 44 retreats inward from the side panel 19. The side panel 19 is thus located outside the periphery 44. In this case, the edge 17 may be defined along the periphery of a flat surface defined in the frame 14a.

The tip end of the connector 42 is exposed in the depression 43 in this manner. The user can locate the connector 42 without looking into the side of the main body enclosure 12. The user can thus insert a plug into the connector 42 with a higher reliability. Furthermore, the user can reliably distinguish the kind of the connector 42 based on the shape and/or the color of the connector 42.

Figure 7:
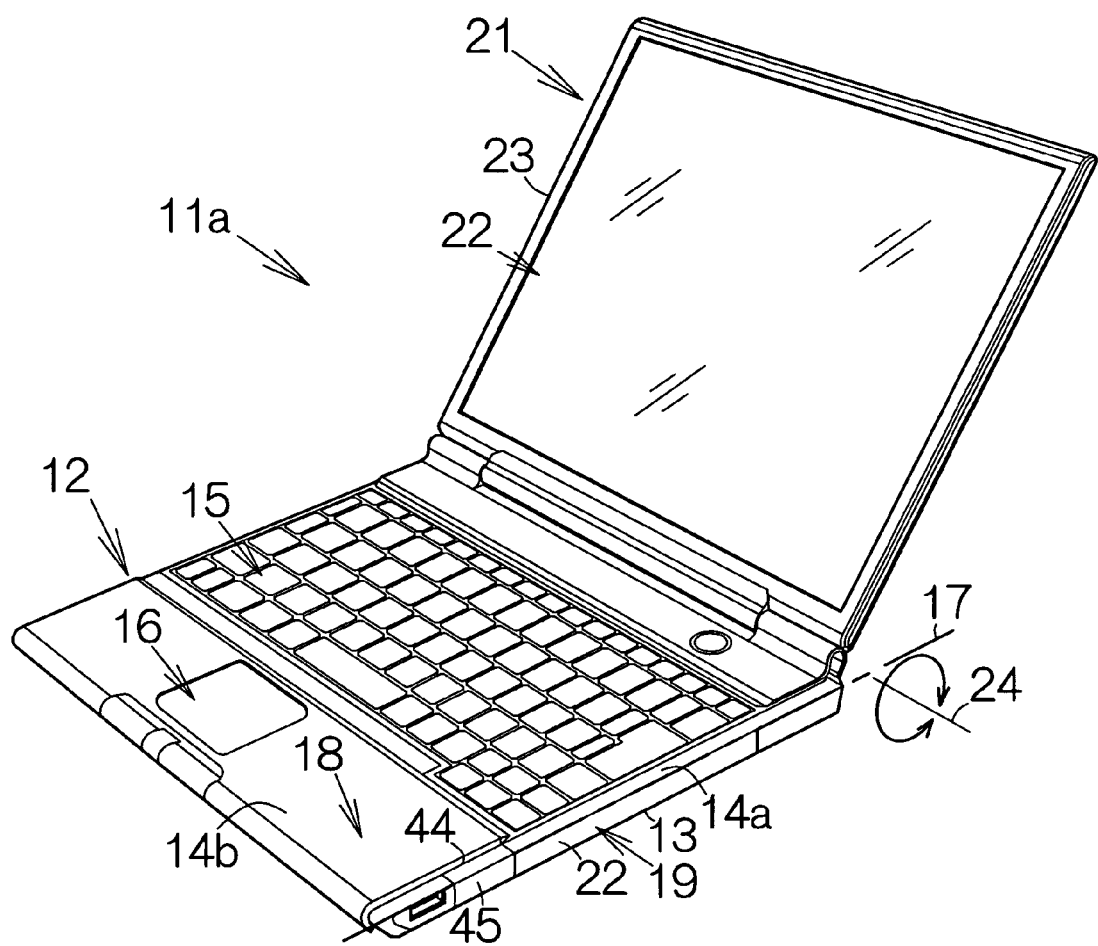
FIG. 7 is a perspective view schematically illustrating the notebook personal computer of the modified embodiment with a cover member located in a depression.

As shown in FIG. 7, for example, a cover member 45 may removably be located in the depression 43 in the notebook personal computer 11a. The cover member 45 is designed to enclose the connector 42, for example. The outer surface of the cover member 45 may be flush with the side panel 19. The cover member 45 thus covers over the tip end of the connector 42. The cover member 45 may be made of a resin material such as polycarbonate, for example. The cover member 45 contributes to establishment of a good appearance of the main body enclosure 12. Furthermore, the cover member 45 can surely protect the connector 42 from damages.

The present invention can be applied to female connectors having various shapes and various colors other than the USB connector 25, the connectors 32, 33 and the connector 42, for example. In this case, the depression may appropriately be formed in conformity with the shape of the female connector.

When the notebook personal computer 11, 11a employs a thinner connector such as the USB connector 25, the connectors 32, 33, and the like, thinner than the thickness of the main body enclosure 12, the size of the depression may be set in conformity with the size of the connector. A space can in this manner be obtained below the depression at the side of the base 13. The space can be utilized to contain other components and cables.

What is claimed is:

1. An electronic apparatus comprising:
   a main body enclosure including an upper portion, a front panel, a rear panel, and at least one side wall covering over an upper surface, a front surface, a rear surface, and at least one side surface of an inner space of the main body enclosure, the side wall being defined between the front panel and the rear panel;
   a display device coupled to the main body enclosure for relative rotation around a rotation axis established at an end of the main body enclosure; and
   a connector incorporated in the main body enclosure at the side of the main body enclosure, wherein
   the upper portion has a peripheral edge retreating from a tip end of the connector at the one side surface of the inner space of the main body enclosure.

2. The electronic apparatus according to claim 1, wherein said side wall is located outside the peripheral edge of the upper portion.

3. The electronic apparatus according to claim 1, wherein a depression is defined in the side wall in conformity with the peripheral edge of the upper portion.

4. The electronic apparatus according to claim 3, further comprising a cover member removably located in the depression so as to cover over the tip end of the connector.

5. The electronic apparatus according to claim 1, further comprising a keyboard incorporated in the upper portion.

6. An electronic apparatus comprising:
   an enclosure;
   a female connector incorporated in the enclosure;
   a first support portion defined in the enclosure, the first support portion entirely surrounding the female connector; and
   a second support portion defined in the enclosure at a position adjacent to an outer end of the first support portion, the second support portion partly surrounding the female connector so as to allow exposure of a part of a periphery of the female connector.

7. The electronic apparatus according to claim 6, wherein the female connector receives insertion of a male connector in a horizontal direction.

8. An electronic apparatus comprising:
   an enclosure body;
   a female connector extending in a horizontal direction;
   a depression formed in the enclosure body, the depression extending from an inner end to an outer end, the inner end facing an inner space of the enclosure body, the outer end facing an outside space of the enclosure body, said depression receiving an outer surface of the female connector; and
   an enclosure cover covering over the depression, the enclosure cover defining a periphery retreating from an outer end of the female connector toward the inner end of the depression.

9. An electronic apparatus comprising:
   a main body enclosure including a bottom, a top and at least one side along a bottom surface, a top surface and at least one side surface of a box-shaped space;
   a display device coupled to the main body enclosure for relative rotation around a rotation axis established at an end of the main body enclosure; and
   a connector supported in the side of the main body enclosure, the connector located within the box-shaped space, wherein
   the top of the main body enclosure has a portion along the top surface of the box-shaped space at a position near the connector, said portion formed to make the connector visible.

10. The electronic apparatus according to claim 9, wherein the portion takes a shape to make the connector visible.

11. The electronic apparatus according to claim 10, wherein the side of the enclosure has a depression depressed from the side surface of the box-shaped space at a position near the connector, said depression occupying a space of a predetermined thickness under the top surface of the box-shaped space within an overall thickness of the enclosure.

12. The electronic apparatus according to claim 10, wherein the side of the enclosure has a depression at a position near the connector, the depression depressed from the side surface of the box-shaped space, the depression occupying a space extending from the top surface of the box-shaped space to the bottom surface of the box-shaped space.

13. The electronic apparatus according to claim 12, further comprising a cover member removably located in the depression so as to cover over the connector.

14. The electronic apparatus according to claim 9, further comprising a keyboard incorporated in the top of the enclosure.

* * * * *